United States Patent
Kimura

(10) Patent No.: US 12,361,317 B2
(45) Date of Patent: Jul. 15, 2025

(54) SIGNAL PROCESSING METHOD, SIGNAL PROCESSING DEVICE, AND SIGNAL PROCESSING PROGRAM

(71) Applicant: TOHOKU UNIVERSITY, Sendai (JP)

(72) Inventor: Yoshitaka Kimura, Sendai (JP)

(73) Assignee: TOHOKU UNIVERSITY, Sendai (JP)

(*) Notice: Subject to any disclaimer, the term of this patent is extended or adjusted under 35 U.S.C. 154(b) by 1011 days.

(21) Appl. No.: 17/373,065

(22) Filed: Jul. 12, 2021

(65) Prior Publication Data
US 2021/0342695 A1    Nov. 4, 2021

Related U.S. Application Data

(63) Continuation of application No. PCT/JP2019/002572, filed on Jan. 25, 2019.

(51) Int. Cl.
| | | |
|---|---|---|
| G06F 18/2413 | (2023.01) | |
| G06N 3/084 | (2023.01) | |
| G06N 20/00 | (2019.01) | |

(52) U.S. Cl.
CPC ......... *G06N 20/00* (2019.01); *G06F 18/2413* (2023.01); *G06N 3/084* (2013.01)

(58) Field of Classification Search
CPC .............. G06F 18/213; G06F 2218/00; G06F 2218/08; G06F 18/2413; G06N 20/00; G06N 3/084
See application file for complete search history.

(56) References Cited

U.S. PATENT DOCUMENTS

| | | |
|---|---|---|
| 6,778,701 B1 | 8/2004 | Okajima |
| 2007/0167846 A1 | 7/2007 | Sternickel et al. |
| 2008/0146953 A1 | 6/2008 | Kimura et al. |
| 2015/0018704 A1 | 1/2015 | Fang et al. |
| 2020/0105414 A1 | 4/2020 | Kikuchi et al. |

(Continued)

FOREIGN PATENT DOCUMENTS

| | | |
|---|---|---|
| JP | 2001-101418 A | 4/2001 |
| JP | 2006-204759 A | 8/2006 |

(Continued)

OTHER PUBLICATIONS

Lin Lin et al., MEMS Chip Quality Detection by Fast Image Matching Method, IEEE, 2014, pp. 635-639, the 9th International Conference on Computer Science & Education (ICCSE 2014) Vancouver, Canada, Aug. 22-24, 2014.

(Continued)

*Primary Examiner* — Mi'schita' Henson
(74) *Attorney, Agent, or Firm* — Myers Wolin, LLC

(57) ABSTRACT

A signal processing method includes: obtaining signals of two systems, the signals being a measuring system signal being a measurable time-series signal expressed in a real space, and a referring system signal being referred in a process of the measuring system signal and being expressed in the real space; extracting, based on a process using the signals of the two systems obtained in the obtaining and being performed in the real space, a time-series-feature expressing a feature of the measuring system signal in the real space; and converting the time-series-feature extracted in the extracting into a feature real-expression-feature being an expression of an information space dual with the real space.

15 Claims, 14 Drawing Sheets

(56) References Cited

U.S. PATENT DOCUMENTS

| | | | | |
|---|---|---|---|---|
| 2023/0271059 A1* | 8/2023 | Chen | ................. | A63B 24/0062 |
| | | | | 482/8 |
| 2024/0177863 A1* | 5/2024 | Kadoya | ................. | G16H 30/40 |

FOREIGN PATENT DOCUMENTS

| JP | 2007-527266 A | 9/2007 |
|---|---|---|
| JP | 2018-206082 A | 12/2018 |

OTHER PUBLICATIONS

Extended European search report with supplementary European search report and the European search opinion issued by the European Patent Office for corresponding European Patent Application No. 19911555.1-1203, dated Sep. 9, 2022.

International Search Report of the International Searching Authority issued by the Japan Patent Office for corresponding International Patent Application No. PCT/JP2019/002572, mailed on Apr. 2, 2019, an English translation.

International Preliminary Report on Patentability issued by the International Bureau of WIPO for corresponding International Patent Application No. PCT/JP2019/002572, dated Jul. 27, 2021, with Written Opinion of International Searching Authority issued by Japan Patent Office for corresponding patent application PCT/JP2019/002572, mailed on Apr. 2, 2019.

Notice of Reasons for Refusal issued by the Japan Patent Office for corresponding Japanese Patent Application No. 2020-567349 mailed on Feb. 21, 2023, with an English translation.

* cited by examiner

FIG.2A

| NUMBER | 1 | | | 2 | | |
|---|---|---|---|---|---|---|
| BIT PATTERN | 1 | 1 | 1 | 0 | 1 | 1 |
| | 1 | 0 | 1 | 1 | 0 | 1 |
| | 1 | 0 | 1 | 1 | 0 | 1 |
| | 1 | 1 | 1 | 1 | 1 | 1 |

FIG.2B

| NUMBER | 3 | | | 4 | | |
|---|---|---|---|---|---|---|
| BIT PATTERN | 0 | 1 | 0 | 1 | 1 | 0 |
| | 0 | 1 | 0 | 0 | 1 | 0 |
| | 0 | 1 | 0 | 0 | 1 | 0 |
| | 0 | 1 | 0 | 0 | 1 | 0 |

| | 1 | 2 | 3 | 4 |
|---|---|---|---|---|
| 1 | 1 | 0 | 0 | 1 |
| 2 | 1 | 1 | 1 | 1 |
| 3 | 1 | 1 | 0 | 0 |
| 4 | 1 | 1 | 0 | 0 |
| 5 | 0 | 0 | 1 | 1 |
| 6 | 1 | 1 | 0 | 0 |
| 7 | 1 | 1 | 0 | 0 |
| 8 | 0 | 0 | 1 | 1 |
| 9 | 1 | 1 | 0 | 0 |
| 10 | 1 | 1 | 0 | 0 |
| 11 | 1 | 1 | 1 | 1 |
| 12 | 1 | 1 | 0 | 0 |

FIG.4

| 1 | 2 | 3 |
|---|---|---|
| 4 | 5 | 6 |
| 7 | 8 | 9 |
| 10 | 11 | 12 |

FIG.6A
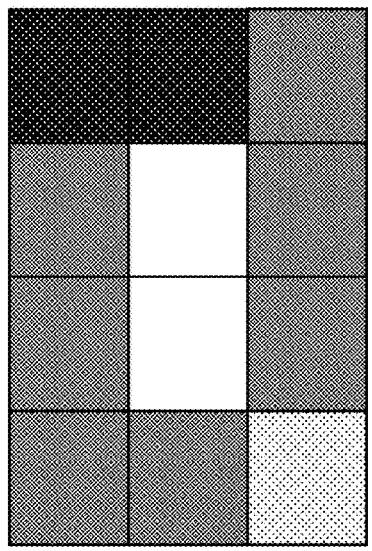
FIG.6B
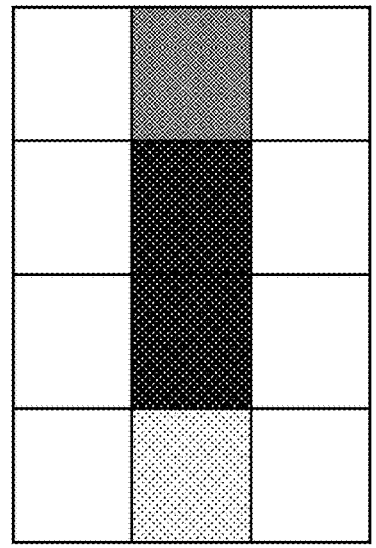
FIG.6C
DISTINGUISHING BETWEEN 0 AND 1

SQUARE NUMBER

SQUARE NUMBER

FIG.9A
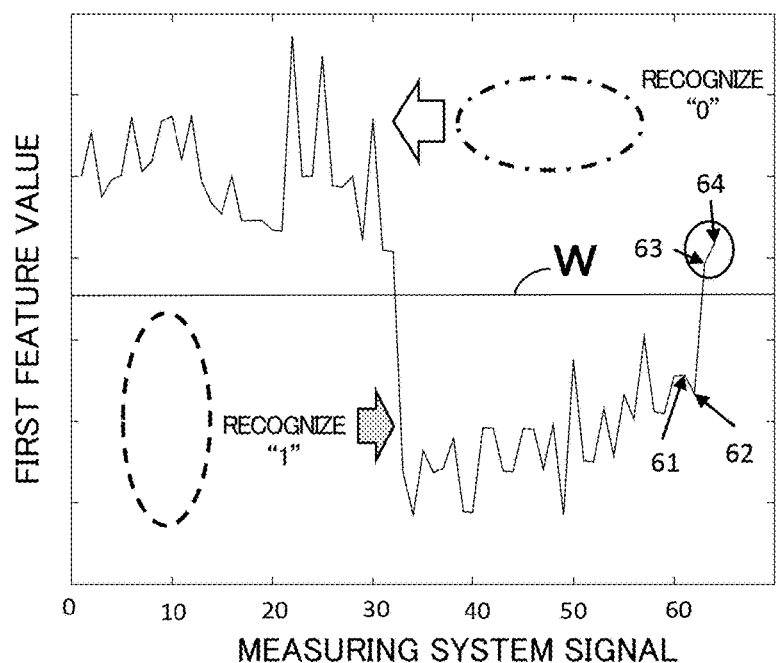
FIG.9B
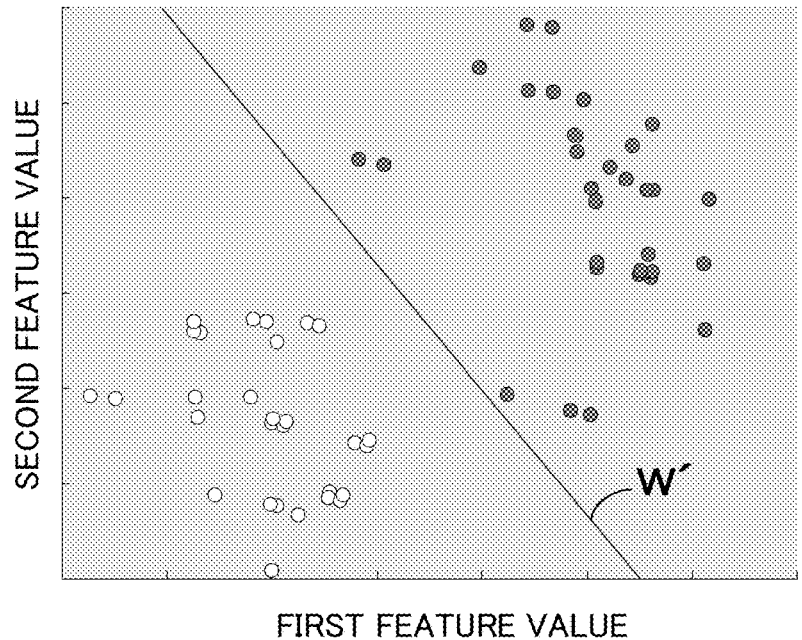
FIG.9C
FIG.9D

DATA HAVING LITTLE NOISE

DATA HAVING MUCH NOISE

SIGNAL PROCESSING METHOD, SIGNAL PROCESSING DEVICE, AND SIGNAL PROCESSING PROGRAM

CROSS-REFERENCE TO RELATED APPLICATION

This application is a continuation application of International Application PCT/JP2019/002572, filed on Jan. 25, 2019 and designated the U.S., the entire contents of which are incorporated herein by reference.

FIELD

The embodiments discussed herein are related to a signal processing method, a signal processing device, and a non-transitory computer-readable recording medium having stored therein a signal processing program.

BACKGROUND

As one of the signal processing techniques, a scheme which classifies signals according to features has been known. Specifically, a scheme has been developed which distinguishes signals on the basis of a conversion matrix in which the weighting factors are optimized by back propagation. In such backward processing, feature extraction of signals and distinguishing of signals for each feature are processed integrally on the basis of, for example, one guideline represented by a conversion matrix.

As a technique of applying machine learning (so-called AI (Artificial Intelligence)) of the information space as described above to the medical field, a scheme for determining an abnormality of the magnetocardiogram (see Patent Document 1) has been studied.

Patent Document 1: Japanese National Publication of International Patent Application No. 2007-527266

SUMMARY

However, since the processing process in the backward processing in the information space is black-boxed as described above, it is difficult to separate the feature extraction of the signals from the distinguishing of signals for each feature. Therefore, the above machine learning still have room for improvement in enhancing the signal processability.

A signal processing method disclosed herein includes: an obtaining step that obtains signals of two systems, the signals being a measuring system signal being a measurable time-series signal expressed in a real space, and a referring system signal being referred in a process of the measuring system signal and being expressed in the real space; an extracting step that extracts, based on a process using the signals of the two systems obtained in the obtaining step and being performed in the real space, a time-series-feature expressing a feature of the measuring system signal in the real space; and a converting step that converts the time-series-feature extracted in the extracting step into a real-expression-feature being an expression of an information space dual with the real space.

A signal processing device disclosed herein includes: an obtainer that obtains signals of two systems, the signals being a measuring system signal being a measurable time-series signal expressed in a real space, and a referring system signal being referred in a process of the measuring system signal and being expressed in the real space; an extractor that extracts, based on a process using the signals of the two systems obtained by the obtainer and being performed in the real space, a time-series-feature expressing a feature of the measuring system signal in the real space; and a converter that converts the time-series-feature extracted by the extractor into a real-expression-feature being an expression of an information space dual with the real space.

A non-transitory computer-readable recording medium having stored therein a signal processing program that causes a computer to execute a process including: obtaining signals of two systems, the signals being a measuring system signal being a measurable time-series signal expressed in a real space, and a referring system signal being referred in a process of the measuring system signal and being expressed in the real space; extracting, based on a process using the signals of the two systems obtained and being performed in the real space, a time-series-feature expressing a feature of the measuring system signal in the real space; and converting the time-series-feature extracted into a real-expression-feature being an expression of an information space dual with the real space.

BRIEF DESCRIPTION OF THE DRAWINGS

FIG. 2A and FIG. 2B are schematic diagrams showing exemplary signals of the information space;

FIG. 4 is a conversion table for explaining bit patterns of signals shown in FIG. 1A, FIG. 1B, FIG. 2A, and FIG. 2B;

FIG. 6A and FIG. 6B are diagrams schematically showing examples of a referring system signal and FIG. 6C is a diagram schematically illustrating an example of a plurality of measuring system signal;

FIG. 9A and FIG. 9B are diagrams showing distinguishing results, and FIG. 9C and FIG. 9D are enlarged views of a part of FIG. 6C;

DESCRIPTION OF EMBODIMENTS

Figure 1A:
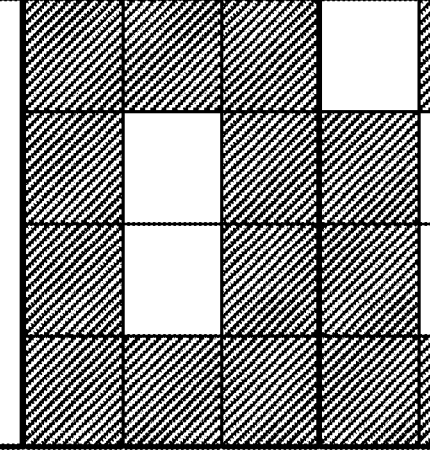
FIG. 1A and FIG. 1B are schematic diagrams showing exemplary signals of an information space.

Hereinafter, description will now be made in relation to a signal processing method, a signal processing device, and a signal processing program according to the embodiment.

The inventor of the present application has found a scheme for extracting a features of a predetermined a time-series signal (measuring system signal) in a real space by referring to an arbitrary representative time-series signal (referring system signal) which is considered to be obtained as a result of distinguishing. In other words, the finding is a scheme of extracting a feature of a predetermined time-series signal which can be expressed in an information space having duality with the real space by processing, in the real space, a time-series signal being the distinguishing target and a referring system signal. The inventor found that, since the feature extracted by this scheme can be said to be a reason for distinguishing (asserting a significant to) a predetermined time-series signal, a reason for distinguishing, which has been black-boxed in the so-called deep learning method can be visualized.

As performed in the above, a scheme of distinguishing a time-series signal after extracting a feature of the time-series signal through forward processing is called a "referring learning method".

I. One Embodiment

Hereinafter, the condition for processing a signal according to the present embodiment will be described in item [1]. After that, each step performed by the signal processing scheme of the present embodiment will be described in item [2]. The operation and effects of this signal processing scheme are described in item [3].

Besides, in regard of a specific configuration that achieves the present signal processing scheme, a hardware configuration is described in item [4] and a software configuration is described in item [5].

[1. Condition]

First, description will now be made in relation to two spaces where signals are processed in the present scheme and signals of these space.

In the present scheme, signals are processed in two kinds of spaces, i.e., an information space and a real space.

The information space and the real space are dual spaces with each other. This means that a signal expressed in the information space is backed by a signal expressed in the real space, and on the contrary, a signal expressed in the real space is backed by a signal expressed in the information space.

A signal in the information space can be processed backward, including back propagation. An input/output signal in the information space can be recognized by a person, but since such input/output signal is encoded in "0" and "1" in the course of an arithmetic process, it is difficult to recognize contents of the signal. In contrast to the above, a signal of the real space can be processed forward using the function arithmetic operation. Although it is difficult for a person to recognize an input/output signal in the real space because the signal is a time-series signal, the signal can be converted in a step of, for example, graphing, and the contents of the signal can be confirmed (recognized) even while being calculated. Here, the processing forward means a deductive process leading to distinguishing from the data using a function arithmetic operation. Therefore, the real space can be said to be a space that can process a cognitive signal by a deductive scheme. On the other hand, the information space can be said to be a space that can process a signal that are difficult in recognizing by an inductive scheme.

Hereinafter, the signals of the information space and the real space will be described with reference to respective examples. Here, the following signals 0 and 1 are given as examples.

Signal 0: a signal representing the shape of "0"
Signal 1: a signal representing the shape of "1"

——A Signal in the Information Space——

First, description will now be made in relation to a signal in the information space exemplified by a signal recorded with binary signals in squares (bits) associated with the numbers 1 to 12 shown in FIG. 4.

The signals 0 and 1 in the information space are expressed in the following two types of bit pattern signal (hereinafter abbreviated to "BP signal") shown below.

Monochrome BP signal: a signal expressed by colored or colorless squares
Binary BP signal: a signal expressed by squares set to digit 0 or 1

Figure 1B:
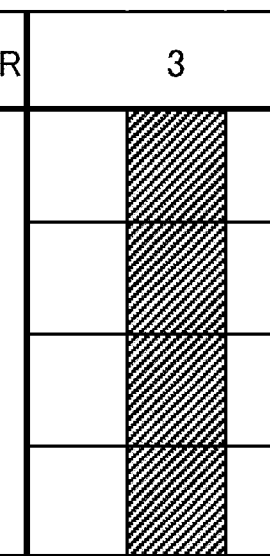

FIG. 1A and FIG. 1B show examples of a monochrome BP signal, and FIGS. 2A and 2B show an example of a binary BP signal.

FIG. 1A illustrates two signals 0 (numbers 1 and 2). The signal 0 having the number 1 has a bit pattern in which squares of the numbers 1-4, 6, 7, and 9-12 are colored (e.g., a square patterned with, for example, a thin stripe, a thick stripe, a thin grating, a dark grating, or a dot; hereinafter referred to as "colored") and squares of the numbers 5 and 8 are colorless (white, hereinafter referred to as "colorless"). The signal 0 having the number 2 has the same bit pattern as that of the signal 0 having the number 1 except for the square of the number 1, which is colored in the signal 0 having the number 1", being colorless.

FIG. 1B illustrates two signals 1 (Numbers 3 and 4). The signal 1 having the number 3 has a bit pattern in which the squares of the numbers 2, 5, 8, and 11 are colored and the squares of the numbers 1, 3, 4, 6, 7, 9, 10, and 12 are colorless. The signal 1 having the number 4 the same bit pattern as that of the signal 1 having the number 3 except for the square of the number 1, which is colorless in the signal 1 having the number 3, being colored.

FIG. 2A shows binary BP signals corresponding to the monochrome BP signals of FIG. 1A. Similarly, FIG. 2B shows binary BP signals corresponding to the monochrome BP signals of FIG. 1B. These binary BP signals are signals expressing each colored square of the corresponding monochrome BP signals by a digit "1" and expressing each colorless square of the corresponding monochrome BP signals by a digit "0".

For example, the signal 0 having the number 1 in FIG. 2A corresponds to the signal 0 having the number 1 in FIG. 1A, and has a pattern in which the squares of the number 1-4, 6, 7, and 9-12 each have a digit "1", and the squares having the number 5 and 8 each have a digit "0".

——A Signal in the Real Space——

Next, signals 0 and 1 in the real space corresponding to the signals 0 and 1 of the information space described above will now be described.

The signals 0 and 1 in the real space described here are a series of signals expressed in enumerated numerical values 0 and 1 (hereinafter referred to as "time-series signal", general time-series signal is also referred to as "time-series signal"). A time-series signal is obtained by performing multi-basis decomposition on a binary BP signal using the conversion table of the bases shown in FIG. 4. The multiple basis decomposition here is a conversion that associates each position of the horizontal axis of the graph with the corresponding value of an information space in the drawing, as shown in the table shown in FIG. 4. In other words, the multi basis decomposition is conversion performed such that the value (signal) of the real space is associated with the value (signal) of the information space by, using the conversion table shown in FIG. 4, generating a graph using the square numbers of FIGS. 2A and 2B as the scale of the horizontal axis of the graph of the FIG. 3B and using the digit 0 or 1 of each square in FIGS. 2A and 2B to the scale of the vertical axis of the graph. At this time, the values in the drawing may be converted using a publicly known function and then associated or may associate multiple values with one another. Using the same table, it is also possible to inversely associate the drawing of the information space from the graph.

Here, the following two types of time-series signals are shown below as examples.

Figures 3A, 3B:
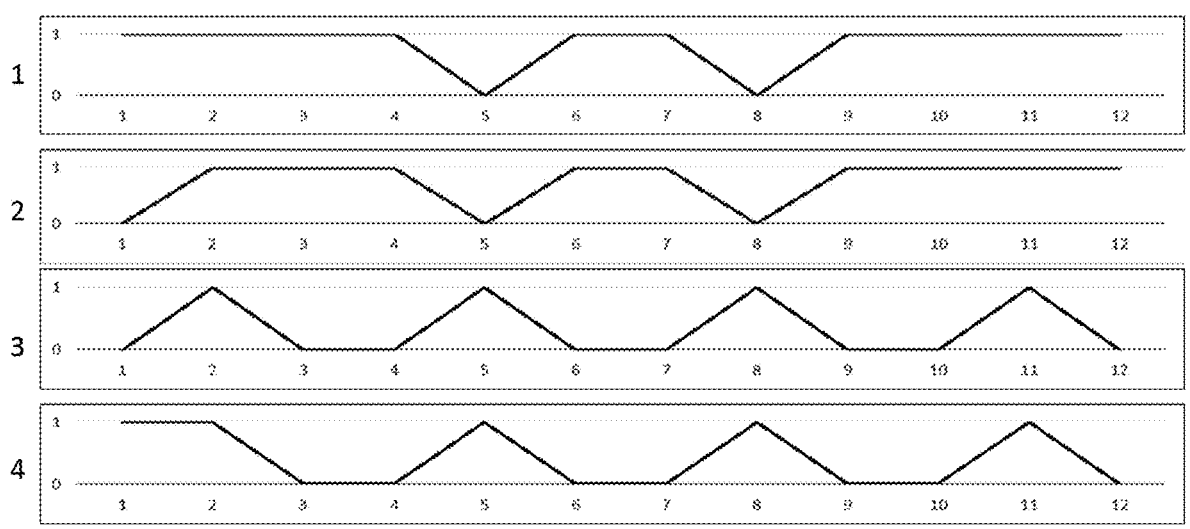
FIG. 3A and FIG. 3B are schematic diagrams showing exemplary signals of a real space.

A first time-series signal: a signal expressing digits 0 and 1 of the respective squares in a row A second time-series signal: a signal expressing digits 0 and 1 of the respective squares in a column Each of FIG. 3A and FIG. 3B illustrates four time-series signals (numbers 1-4), for example. Of these, FIG. 3A shows the first time-series signal, and FIG. 3B shows the second time-series signal.

Figure 4:
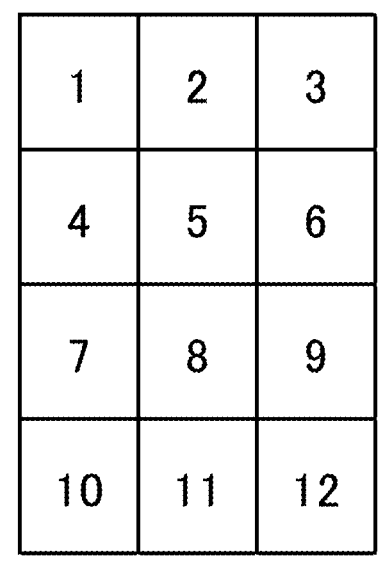

Incidentally, although the input signal in the real space is difficult to recognize a person, FIG. 3A and FIG. 3B schematically illustrate signals in the real space by graphing the signals using the conversion table of FIG. 4.

[2. Step]

Next, referring to the flowchart of FIG. 5, the process implemented in the present signal processing scheme will now be described. Specifically, the following four processes will each be detailed.

Obtaining process: a process of obtaining a signal (Step S1)

Extracting step: a step of extracting a feature based on the obtained signal (Step S5)

Converting step: a step of converting the extracted features (Step S6)

Distinguishing step: a step of distinguishing the signals on the basis of the respective features before and after the conversion (Step S7)

Hereinafter, an example of distinguishing target signals between a signal 0 and a signal 1 will now be described.

[2.1. Obtaining Process]

In the obtaining process, two time-series signals expressed in the real space are obtained.

Of the two time-series signals, one is a measurable signal (hereinafter referred to as "measuring system signal") expressed in the real space, and the other is a signal (hereinafter referred to as "referring system signal") referred to in the processing of the measuring system signal.

In this obtaining process, the measuring system signal is obtained in a first obtaining step (Step S3), the referring system signal is obtained in a second obtaining step (Step S4).

The measuring system signal is a target for extracting a feature, and is also a target for distinguishing based on the extracted feature.

The referring system signal is used for the purpose of feature extraction and consequently distinguishing as described in Japanese Patent No. 4590554. This referring system signal can be arbitrarily set according to the needs of the user may be exemplified by a representative signal of the learning data.

For example, as shown in FIG. 6A or FIG. 6B, a signal obtained by converting a multi-value BP signal color density of which is set in multiple stages into a time-series signal in the real space may be adopted to the referring system signal. Here, FIG. 6A shows an example of the referring system signal of the signal 0 and FIG. 6B shows an example of the referring system signal of the signal 1.

However, at least one of the typical time-series signals exemplified in FIG. 3A and FIG. 3B may also be adopted to the reference series signal.

The referring system signal described above is responsible for the function of correctly directing the feature to be extracted and the distinguishing pattern. By using such a referring system signal, dimensions of the feature and pattern is pulled toward the correct answer in the extracting step and the obtaining process to be described below.

A measuring system signal and a referring system signal obtained in the obtaining process are not limited to signals in the form of being time series in the real space from the beginning, and may alternatively be a signal obtained by converting BP signals in the information space into time series in the real space.

For example, a measuring system signal obtained by the pre-processing step (Step S2) that converts a BP signal (so-called "signal source") of the information space into a time-series signal of the real space may be obtained in the first obtaining step. In this pre-processing step, a time-series signal is obtained by performing multi-basis decomposition on a binary BP signal using the conversion table of FIG. 4.

[2.2. Extracting Step]

In the extraction step, the feature of a measuring system signal is extracted in real space on the basis of the measuring system signal and the referring system signal obtained in the obtaining process. This feature, which is a feature of the time series forming the measuring system signal, is therefore referred to as a "time-series-feature" in the following description.

The extraction processing of the time-series-feature in this extracting step is carried out in the real space. In this real space, the signal processing using the function sequence is carried out. In other words, in the extracting process, a time-series-feature is extracted in real space after forward processing is performed on the measuring system signal and the referring system signal in real space. It should be noted that, for processing using a referring system signal in the extraction step, the analysis method for a referring system independent component described in "Japanese Patent No. 4590554" is applied.

Figure 7A:
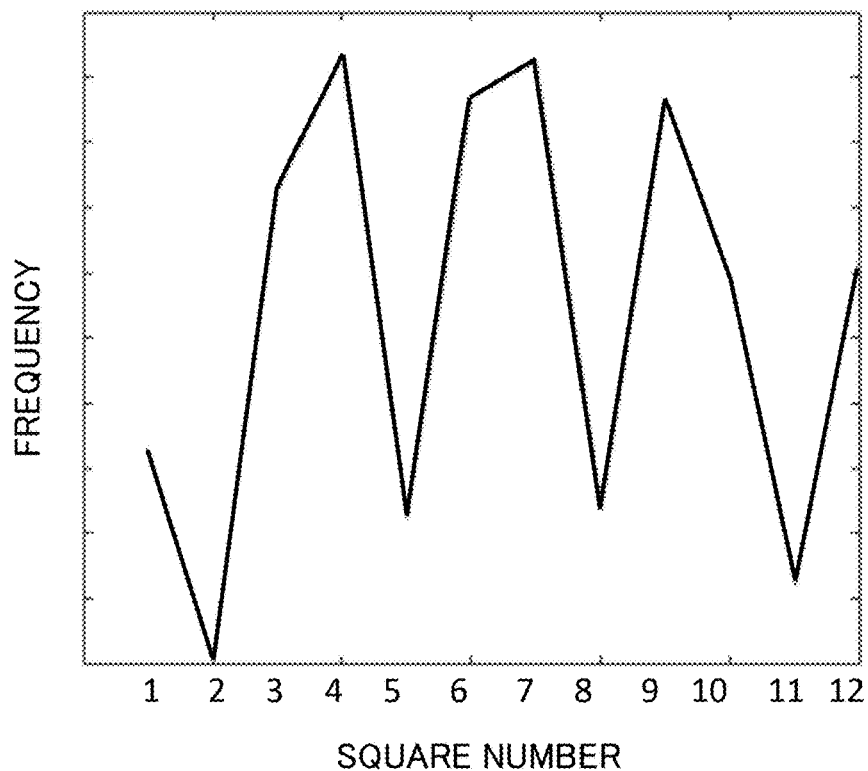
FIG. 7A and FIG. 7B are is a schematic diagram showing time-series-features expressed in the real space.
Figure 7B:
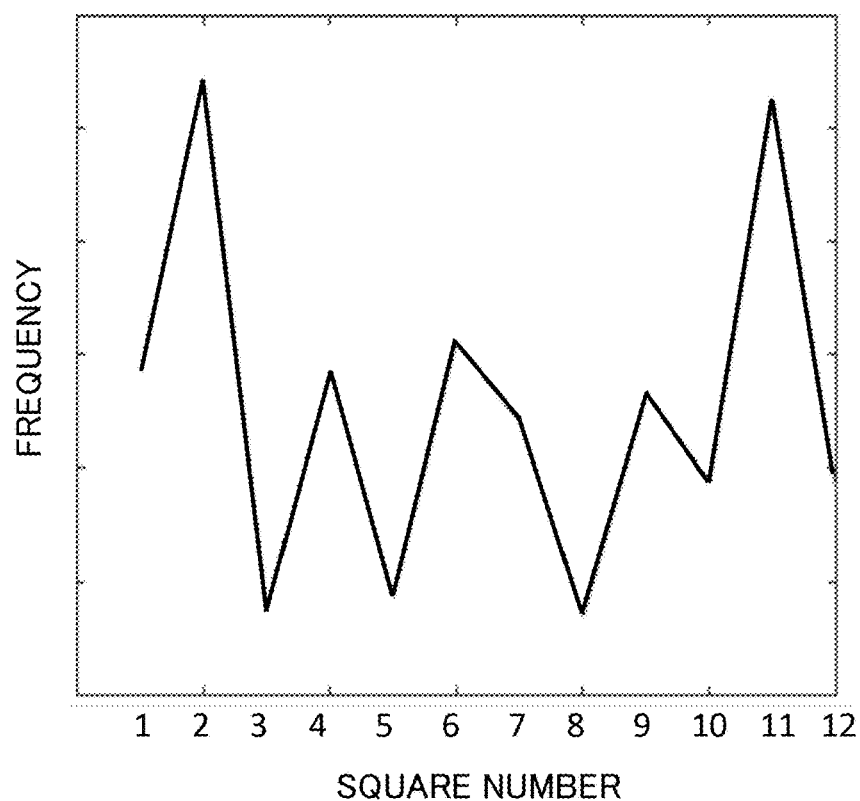

For example, when the multi-valued BP signal bit patterns A and B shown in the FIG. 6A and FIG. 6B used as the referring system signals and also the bit pattern shown in FIG. 6C used as a measuring system signal are used as data for a time-series signal by converting the data into the expression in the real space, time-series-features expressed as FIG. 7A and FIG. 7B are extracted.

Hereinafter, the time-series-features shown in FIG. 7A and FIG. 7B will be concretely described.

In FIG. 7A and FIG. 7B, the square numbers are defined on the horizontal axis, and the frequency is defined on the vertical axis. Of these definition, FIG. 7A shows the time-series-feature of the signal 0, and FIG. 7B shows the time-series-feature of the signal 1.

FIG. 7A exemplifies the time-series-feature of the signal 0 that the frequencies of the square number 1, 3, 4, 6, 7, 9, 10, and 12 are high (in other words, the frequencies of the square number 2, 5, 8, and 11 are low). FIG. 7B exemplifies the time-series-feature of the signal 1 that the frequencies of the square number 2, 4, 6, 7, 9, and 11 are high (in other words, the frequencies of the square number 1, 3, 5, 8, 10, and 12 are low).

In the examples shown in FIG. 7A and FIG. 7B, the extracted features can be easily convinced as features of the signals 1 and 0 by the user. Alternatively, the extracted features may have difficulty in being convinced as features of the signals 1 and 0 that by the user.

[2.3. Converting Step]

In the converting step, the time-series-features extracted in the above extraction step is converted into the expression form of the information space. Such a feature converted from the real space to the information space as the above is called "real-expression-feature" because the information thereof is materialized to be easily understood.

Figure 8:
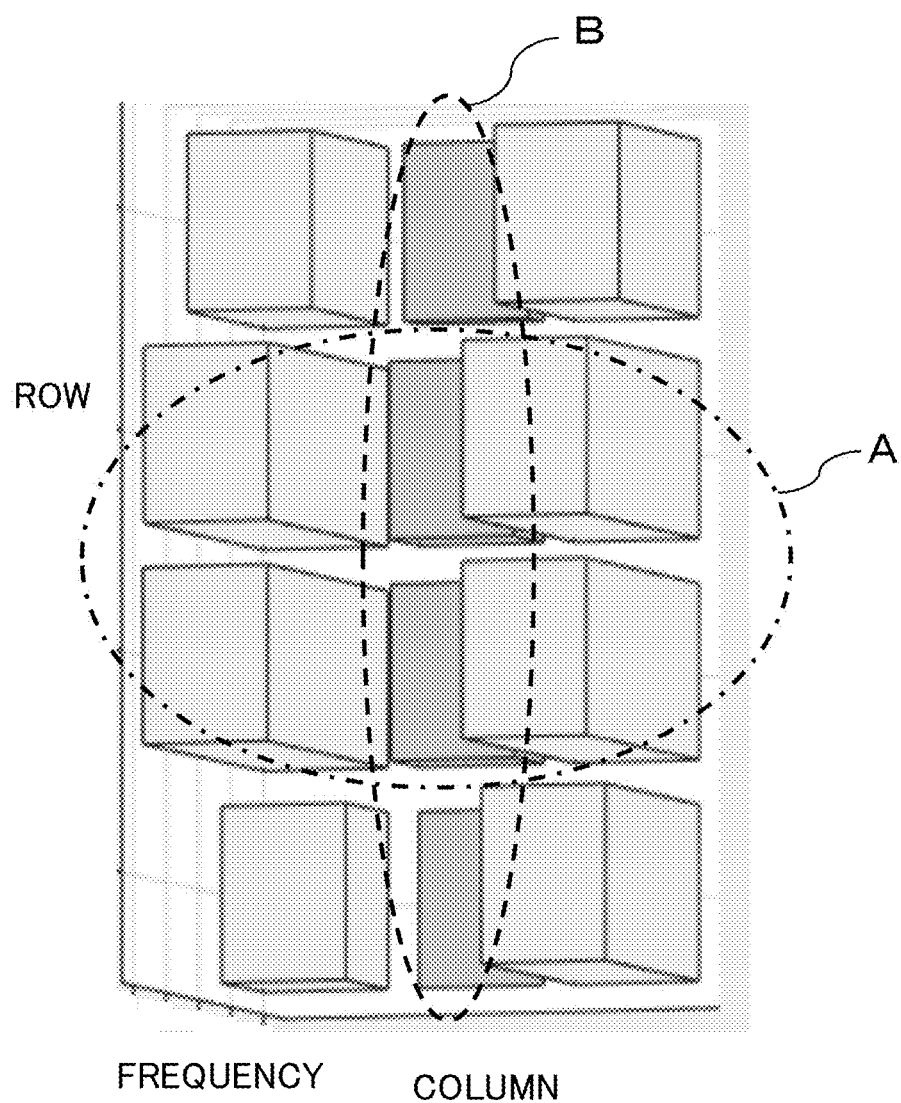
FIG. 8 is a schematic diagram showing a real-expression-features in the information space.

FIG. 8, which schematically shows a real-expression-feature, shows the time-series-feature exemplified in FIG. 7A.

In the real-expression-feature shown in FIG. 8, the feature of the signal 0 is reflected in the range A surrounded by a one-dotted chain line corresponding to the square numbers 4, 5, 6, 7, 8, and 9 and the feature of the signal 1 is reflected in the range B surrounded by a broken line corresponding to the square numbers 2, 5, 8, and 11.

[2.4. Distinguishing Step]

In the distinguishing step, the measuring system signals are distinguished on the basis of the time-series-feature extracted in the above extracting step and the real-expression-feature converted thereto in the above converting step, and the significant of the distinguishing result on the measuring system signals is assessed. Specifically, an inner product of each time-series-feature and the measuring system signal to be distinguished is obtained, and the measuring system signal is distinguished for each pattern of signals 0 and 1 according to the pattern of the referring system signal. The value of inner product of the time-series-feature and the measuring system signal to be distinguished is regarded as the feature value. Here, the feature value of the signal 0 is referred to as a first feature value, and the feature value of the signal 1 is a second feature value.

For example, as shown in FIG. 9A and FIG. 9B, the measuring system signals are distinguished between the signals 0 and 1. The vertical axis of FIG. 9A shows the first feature value, which is the inner product of the time-series-feature of the signal 0 and every measuring system signal of FIG. 6C. The horizontal axis of the FIG. 9A shows arrangement of the first to the 64th measuring system signals shown in FIG. 6C.

The upper side of the boundary line W at the center in FIG. 9A indicates that distinguishing to the signal 0 the feature of which is reflected in the range A surrounded by the one-dotted chain line of FIG. 8. The lower side of the boundary line W at the center in FIG. 9A indicates that distinguishing to the signal 1 the feature of which is reflected in the range B surrounded by the broken line of FIG. 8. The boundary line W serving as a reference for distinguishing measuring system signals exerts the same function as the so-called conversion matrix. The 63th and 64th signals representing the signal 1 on the right end of FIG. 9A are misrecognized to be the signals 0 at the border W. Enlargement of a part of the 61th to 64th measuring system signals of FIG. 6C is shown in FIG. 9C and FIG. 9D. Referring to the 63th and 64th signals 1 of FIG. 9D, the shapes of the 63th and 64th signals 1 have larger fluctuation (noise) than the 61th and 62th signals 1 of FIG. 9C. Therefore, it can be seen that the error has occurred because the matching ratio with the range A in the real-expression feature is higher than that with the range B in FIG. 8. Since the contents can be seen in this learning, the reason why the mistake in distinguishing occurs can be recognized.

FIG. 9B shows the distinguishing step using the first feature value and the second feature value. FIG. 9B illustrates a boundary line W' serving as the reference corresponding to the boundary line W of FIG. 9A. In this FIG. 9B, feature values of the signals 0 and 1 are defined on the vertical axis and the horizontal axis, and a distance along each axis from the boundary line W' represents the degree of likelihoods of the signals 0 and 1. That is, clustering of the signals 0 and 1 is achieved.

[2.5. Modification]

The basic process of the present signal processing scheme is described as the above, and alternatively the present process may be combined into multiple layer and may be provided with an additional process. Hereinafter, a modification of the signal processing scheme additionally provided with the following three steps will now be described.

Learning Step: the process of a learning time-series-feature and a real-expression-feature (Steps S8 and S11)

Updating Step: the step of updating a referring system signal (Step S9)

Pre-obtaining step: the step of obtaining teacher data beforehand (Step S10)

[2.5.1. Learning Step]

The learning process is a process aiming at enhancing the precision of distinguishing measurement system signals by means of time-series-feature obtained in the extracting step, and also aiming at enhancing, for a signal unable to be distinguished, the precision of the reason to be interpreted on the basis of real-expression-feature obtained by the converting step. In addition, the scheme of this learning process can utilize the optimizing scheme of weighting used for pattern distinguishing in the conventional deep learning method.

In this learning process, the overall learning process (Step S11) is carried out in the extracting step, the converting step, and the distinguishing step, and the final learning step (Step S8) is carried out in the distinguishing step which is the last step among the overall learning process. In the overall learning process, the distinguishing of a measuring system signal and the reason thereof are learned using the information on the time-series-feature in the extracting step and also on the distinguishing the measuring system signal in the distinguishing step. In the final learning step, which is finally carried out in this overall learning process, it is preferable to repeat the following learning 1 and 2.

Learning 1: examining structured time-series-feature and real-expression-feature learning 2: examining the time-series-feature and real-expression-feature optimized by learning 1

It is preferable that the above-described learning step is performed when multiple time-series-features are extracted in the extracting step and, responsively, multiple time-series-features are converted into multiple real-expression-features in the converting step. This means that it is preferable that measuring system signals are distinguished on the basis of a combination (second combination) of the time-series-features or a combination (first combination) of real-expression-features. This is because it is possible to obtain the most likely pattern of distinguishing from a combination of the time-series-features or a combination of real-expression-features.

[2.5.2. Updating Step]

The updating step is a step of updating a referring system signal on the basis of the combination of time-series-features or real-expression-features by the learning process. In other words, the updating step is a step of updating a referring system signal by feedback from the combination of features of the measuring system signals.

[2.5.3. Pre-Obtaining Step]

The pre-obtaining step is a step of obtaining, in advance, data (hereinafter referred to as "teacher data") that serves as a teacher of the pattern to be distinguished as a signal used for a referring system signal. Since this pre-obtaining step can be said to be an example of a correct answer of a distinguishing pattern in which the teacher data is set by the user of the present signal processing scheme, this step is performed when the correct answer is present.

[3. Advantage and Effect]

According to the present signal processing scheme, it is possible to obtain the following advantages and effects.

(1) In the obtaining step, a measuring system signal and a referring system signal, which are time-series signals of two systems, are obtained.

In the extracting step, forward processing is performed in the real space, using a measuring system signal and a referring system signal, so that a time-series-feature, which can be expressed in the information space, is extracted. This makes it possible to extract features separately from the distinguishing. In addition, since being deductive or empirical processing using a function, unlike the conventional back propagation, the forward processing in the real space can suppress the processing resources. In other words, it is also possible to speed up the signal processing. Furthermore, referring to the referring system signal in the extracting step makes it possible to carry out processing directed to the correct answer of the distinguishing pattern, so that the problem of over-learning does not occur in principle.

In the converting step, a time-series-feature of the real space is converted to a real-expression-feature expressed in the information space. This makes it possible to obtain the feature of a measuring system signal in the form of a time-series-feature and a real-expression-feature expressed in the information space and the real space being dual with each other, respectively. In this way, the real-expression-feature of the information space corresponding to the time-series-feature of the real space is obtained, so that the feature of the measuring system signal is visualized. Consequently, the signal processing scheme of the present embodiment can visualize the reason for distinguishing that has been black-boxed in the conventional deep learning method.

Therefore, it is possible to enhance the processability of the signal.

(2) In the distinguishing step, an inner product of the time-series-feature and the measuring system signals is obtained and the measuring system signal is distinguished according to the referring system signal. This can distinguish the measuring system signals, using both the time-series-feature and real-expression-feature that are backed each other. Asserting of the significant of the measuring system signal by such distinguishing can be verified by a real-expression-feature generated in the converting step.

(3) In the learning step, the measuring system signals are distinguished on the basis of a combination of real-expression-features of the information space and a combination of time-series-features of the real space. Thereby, the visualized multiple time-series-features can enhance the precision in distinguishing utilizing a conventional deep learning method.

(4) In the updating step, the referring system signal is updated on the basis of the combination of time-series-features and the combination of real-expression features in the distinguishing step. Thereby, the conventional deep learning method can be utilized for enhancing the precision of referring system signals.

(5) In the pre-processing step, the signal source of the information space is multi-basis decomposed, and the measuring system signals of the real space are obtained. This makes it possible to use a broad signal of the information space as a signal source for the measuring system signals. Furthermore, by converting (pre-processing) a signal of the information space into the information of the real space, the signal can be used for forward processing in the real space.

(6) Using the teacher data as a referring system signal in the real space by the pre-obtaining step contributes to enhancement in the precision of extracting a time-series-feature and the distinguishing.

[4. Hardware Configuration]

Figure 10:
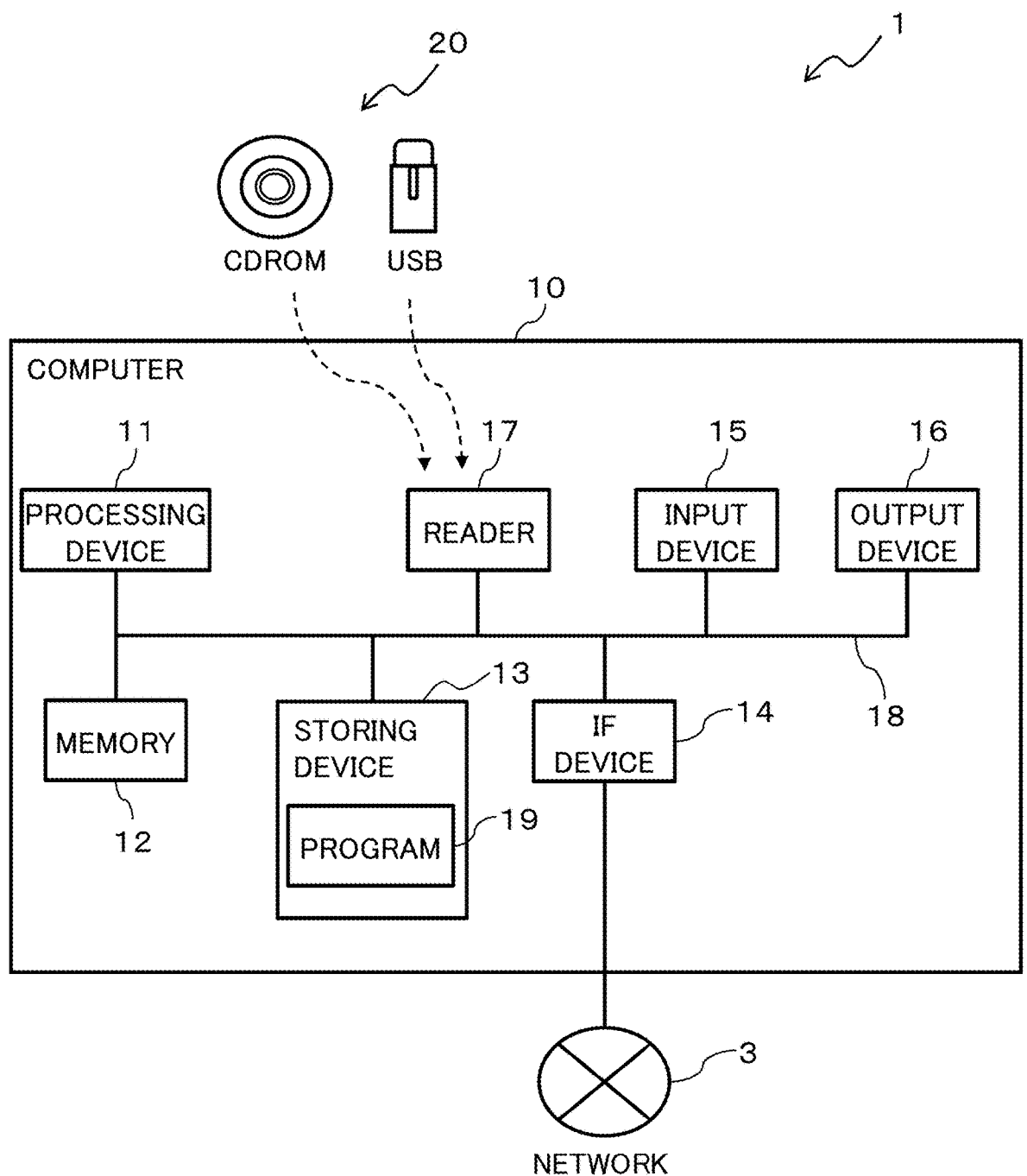
FIG. 10 is a block diagram illustrating a hardware configuration of a signal processing device.

Hereinafter, an example of a hardware configuration of a signal processing device 1 of the present embodiment will now be described with reference to FIG. 10. FIG. 10 is a block diagram illustrating a case where the signal processing device 1 is configured by using a computer 10.

As shown in FIG. 10, the computer 10 includes a processing device 11, a memory 12, a storing device 13, an IF (interface) device 14, an input device 15, an output device 16, and a reader 17. These elements are communicatively connected to each other via a bus 18 (control bus, data bus, etc.) provided inside the computer 10.

The processing device 11 is an example of an arithmetic processing device that performs various controls and operations. As the processor 11, an integrated circuit (IC), such as a CPU (Central Processing Unit), or an FPGA (Field-Programmable Gate Array), is used. The processing device 11 can execute the overall process of the present signal processing scheme by expanding the program 19 (signal processing program) stored in the storing device 13 onto the memory 12 and performing the arithmetic processing.

The program 19 causes a computer to execute a process including obtaining signals of two systems, the signals being a measuring system signal being a measurable time-series signal expressed in a real space, and a referring system signal being referred in a process of the measuring system signal and being expressed in the real space; extracting, based on a forward processing using the signals of the two system obtained and being performed in the real space, a time-series-feature expressing a feature of the measuring system signal in the information space dual with real space.

The memory 12 is an example of a hardware device that stores information such as various data pieces and programs. An example of the memory 12 is a volatile memory such as a RAM (Random Access Memory).

The storing device 13 is an example of a hardware device that stores information such as various data pieces and programs. Examples of the storage device 13 includes a magnetic disk device such as an HDD (Hard Disk Drive), a semiconductor drive device such as an SSD (Solid State Drive), and various storing devices such as a nonvolatile memory.

The IF device 14 is an example of a communication IF that controls connection and communication with the network 3. The IF device 14 may include an adapter conforming to a LAN or an optical communication (e.g., FC (Fiber Channel)). Further, for example, the program 19 may be downloaded from the network 3 to the computer 10 and stored in the storing device 13 via the communication IF.

The input device 15 and the output device 16 may include one of or the both of an input device such as a mouse, a keyboard or an operation button, and an output device such as a monitor exemplified by a touch panel display, an LCD (Liquid Crystal Display), a projector, and a printer.

The reader 17 is an example of a reader that reads data and programs recorded on the recording medium 20. The reader 17 may include a connecting terminal or device to which the recording medium 20 can be connected or inserted. An example of a reader 17 is a drive device that accesses a recording disk or the like. In the recording medium 20, the program 19 and the signal used for processing may be stored, and the reader 17 may read the program 19 and the signals to be used for processing from the recording medium 20 and may store the program 19 and the signals into the storing device 13.

Examples of the a recording medium 20 may be a magnetic/optical disk such as a flexible disk, a CD (Compact Disc), or a non-transitory recording medium such as a flash memory exemplified by a USB memory or a SD card.

The hardware configuration of the computer 10 described above is merely illustrative. Accordingly, the computer 10 may appropriately undergo increase or decrease of hardware devices (e.g., addition or deletion of arbitrary blocks), division, integration in an arbitrary combination, and addition or deletion of the bus.

[5. Software Configuration]

Hereinafter, an example of a software configuration of a signal processing device 1 of the present embodiment will now be described with reference to FIG. 11. The signal processing device 10 having the hardware configuration described above has two functional elements as a basic software configuration for processing signals as shown below. Incidentally, the basic software configuration is shown by solid lines, and a modification is shown by broken lines.

Processor 30: processing a signal
Memory 40: storing a signal processing program, a signal to be used for processing, an extracting result, and a distinguishing result The processor 30 is subdivided into the following four functional elements.

Figure 5:
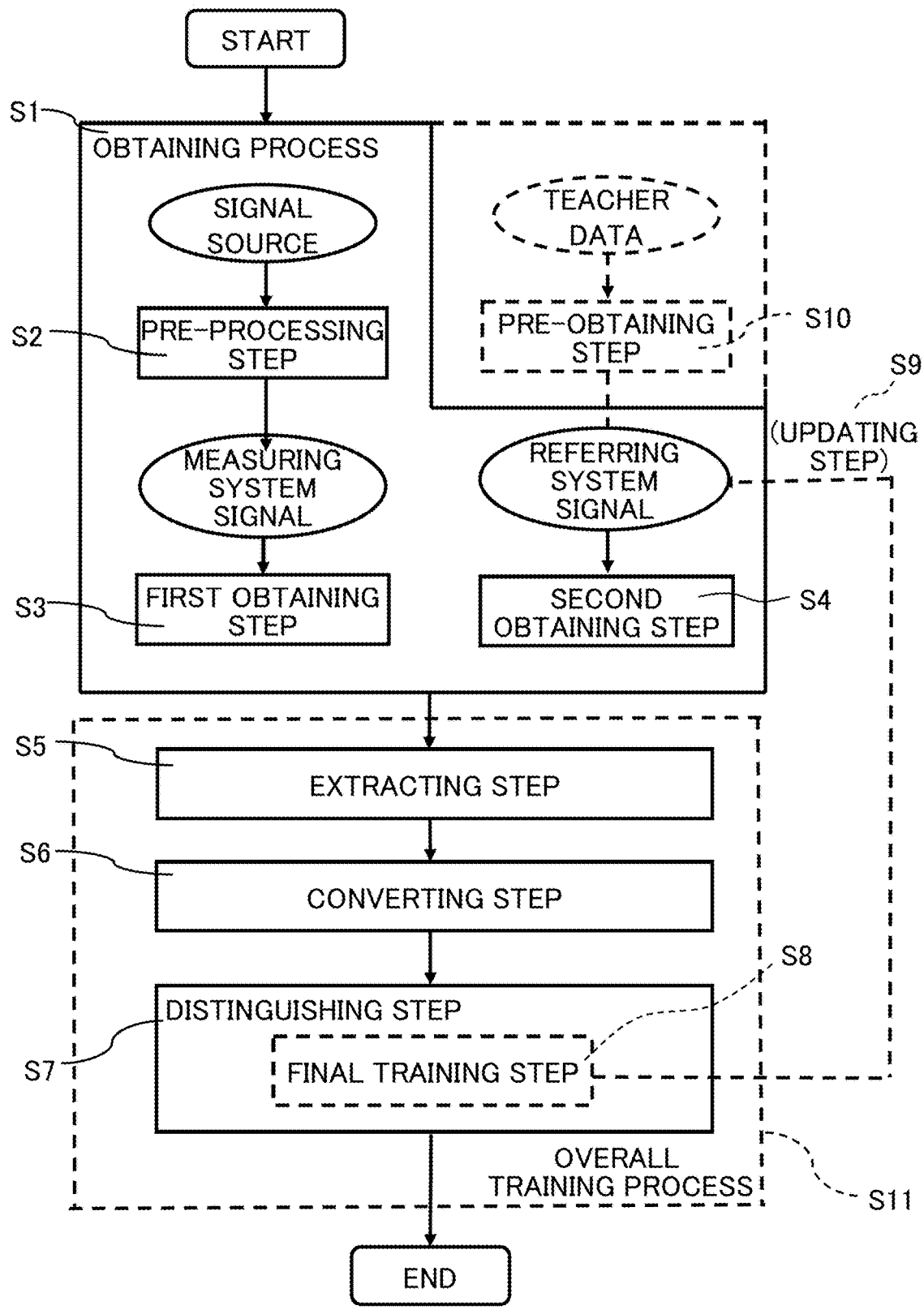
FIG. 5 is a flowchart showing a procedure of a signal processing.

Obtainer 31: performing the obtaining step (Step S1 in FIG. 5)
Extractor 32: performing the extracting step (Step S5 in FIG. 5)
Converter 33: performing the converting step (Step S6 in FIG. 5)
Distinguisher 34: performing the distinguishing step (Step S7 in FIG. 5)

In addition to the above four functional elements, the above-described processor 30 may be provided with the functional elements listed below.

Pre-processor 31*a*: performing the pre-processing step (Step S2 in FIG. 5)
Pre-obtainer 31*b*: performing the pre-obtaining step (Step S10 in FIG. 5)
Final trainer 34*a*: performing the final learning step (Step S8 in FIG. 5)
Updater 34*b*: performing the updating step (Step S9 in FIG. 5)
Overall trainer 35: performing the overall learning process (Step S11 in FIG. 5)

The pre-processor 31*a* described above is preferably included in the obtainer 31, and the final trainer 34*a* and the updater 34*b* are preferably included in the distinguisher 34.

Figure 11:
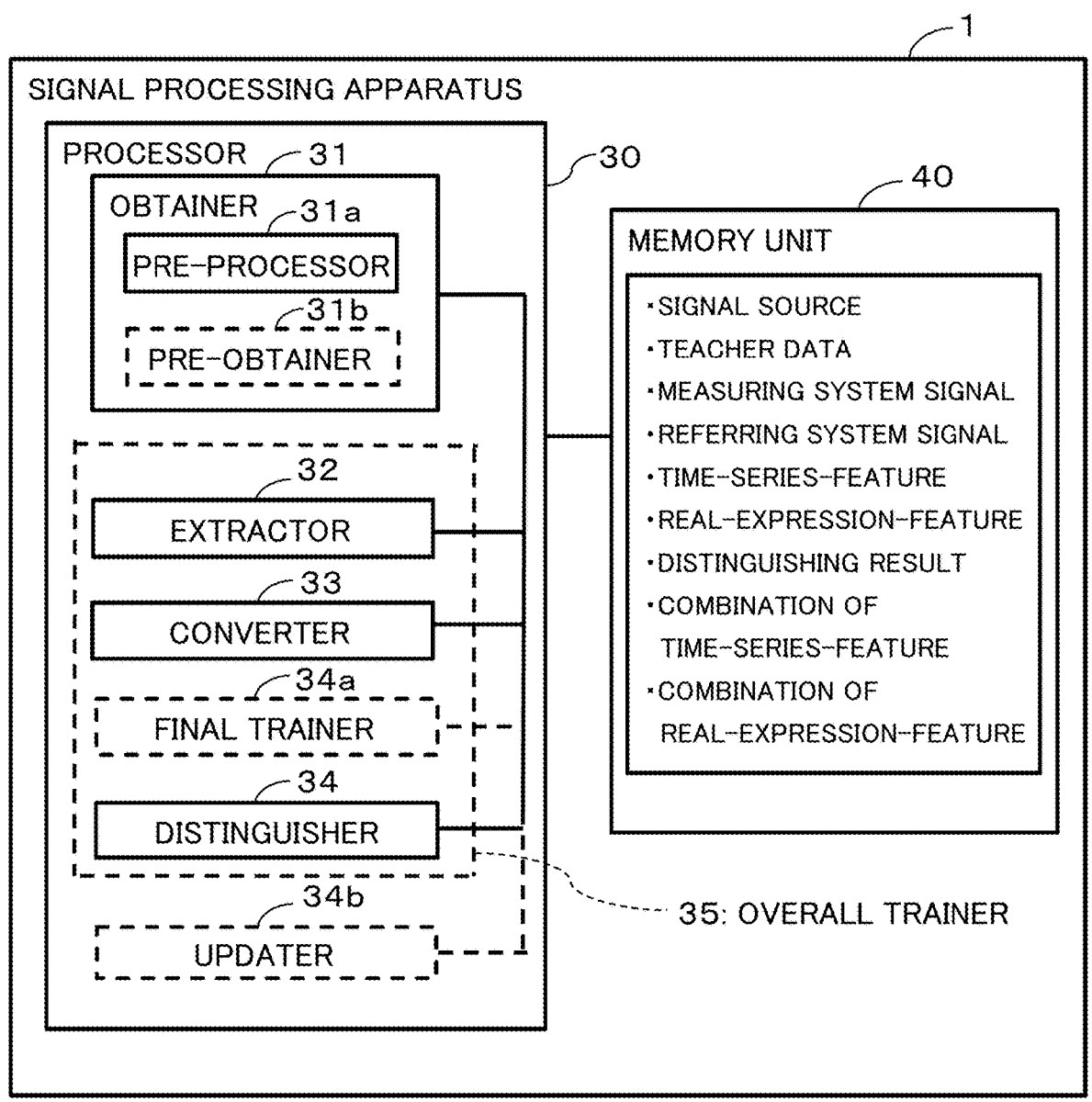
FIG. 11 is a block diagram showing a functional configuration of the signal processing device.

The memory 40 of the signal processing device 1 shown in FIG. 11 may be implemented by at least one of the storage areas of the memory 12 and the storing device 13 of the signal processing device 1 of FIG. 10.

The signal source and the teacher data used in the obtainer 31 and the measuring system signal and the referring system signal obtained by obtainer 31 may be stored in the memory 40.

In addition, the time-series-feature extracted by the extractor 32 and the real-expression-feature obtained by the converter 33 may be stored in the memory unit 40.

Likewise, the distinguishing result obtained in the distinguisher 34, the combination of time-series-features and the combination of real-expression-features in the final trainer 34*a* (overall trainer 35), and the referring system signal updated by the updater 34*b*, may be stored in the memory 40.

According to the signal processing method, the signal processing device, and the signal processing program disclosed herein, the feature can be extracted independently of distinguishing of signals by processing a measuring system signal and a referring system signal in a real space. Therefore, it is possible to enhance the processability of the signal.

[II. Evaluation]

Next, the performance of distinguishing data by this signal processing scheme will now be evaluated.

Here, the performances of distinguishing of the referring system learning method of the present scheme and a conventional deep learning method as a comparing scheme will now be verified.

[1. Verifying Method]

Figure 12A:
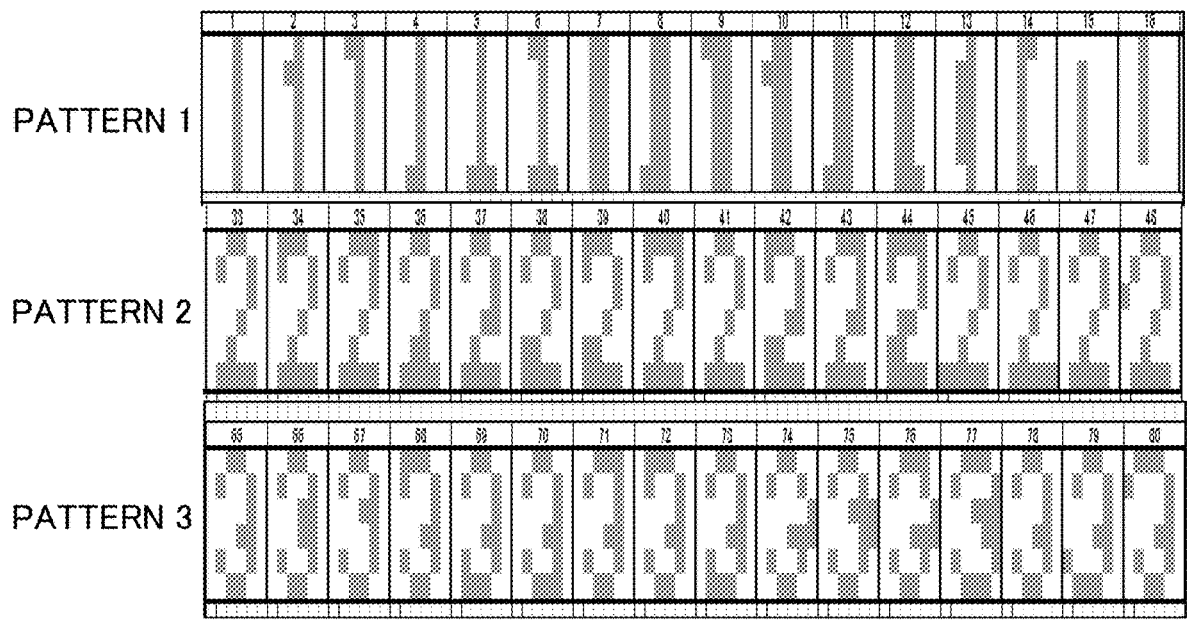
FIG. 12A and FIG. 12B are diagrams showing data used for testing.
Figure 12B:
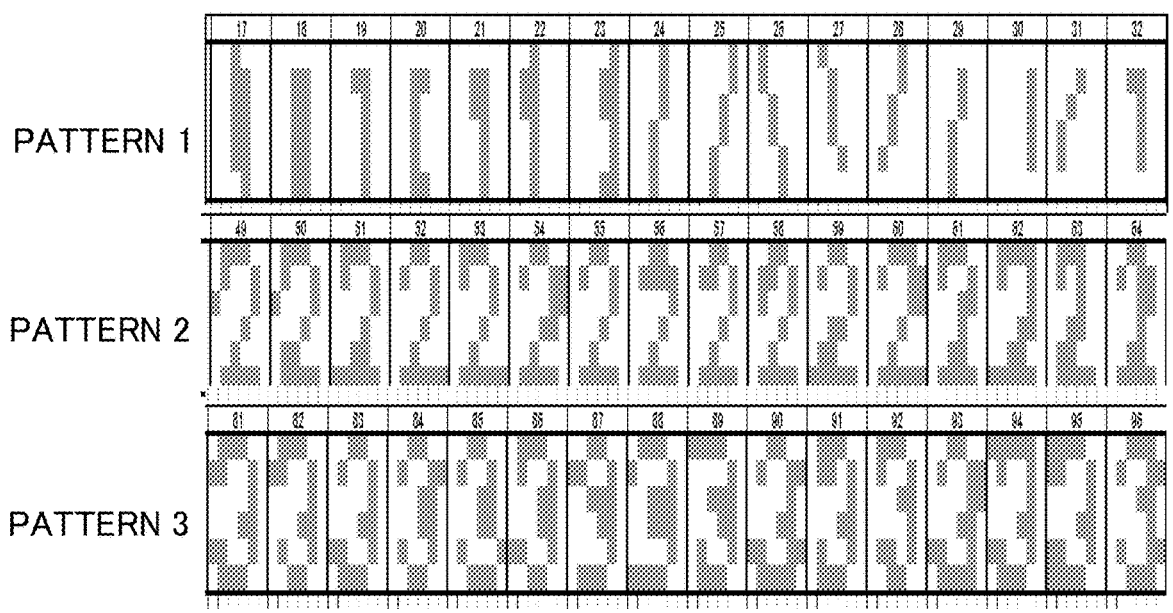

Data to be used for verification are data (FIG. 12A) containing a little noise and data (FIG. 12B) containing much noise. Three types of data (patterns 1-3) corresponding to the signals 1, 2, and 3 were used for each data. Then, the signal processing of learning and distinguishing was carried out along the following schemes of tests 1 and 2.

Test 1: learning with data containing much nose and distinguishing data with containing a little noise
Test 2: learning with data containing a little nose and distinguishing data with containing much noise.

[2. Verifying Result]

<Distinguishing Result>

Figure 13A:
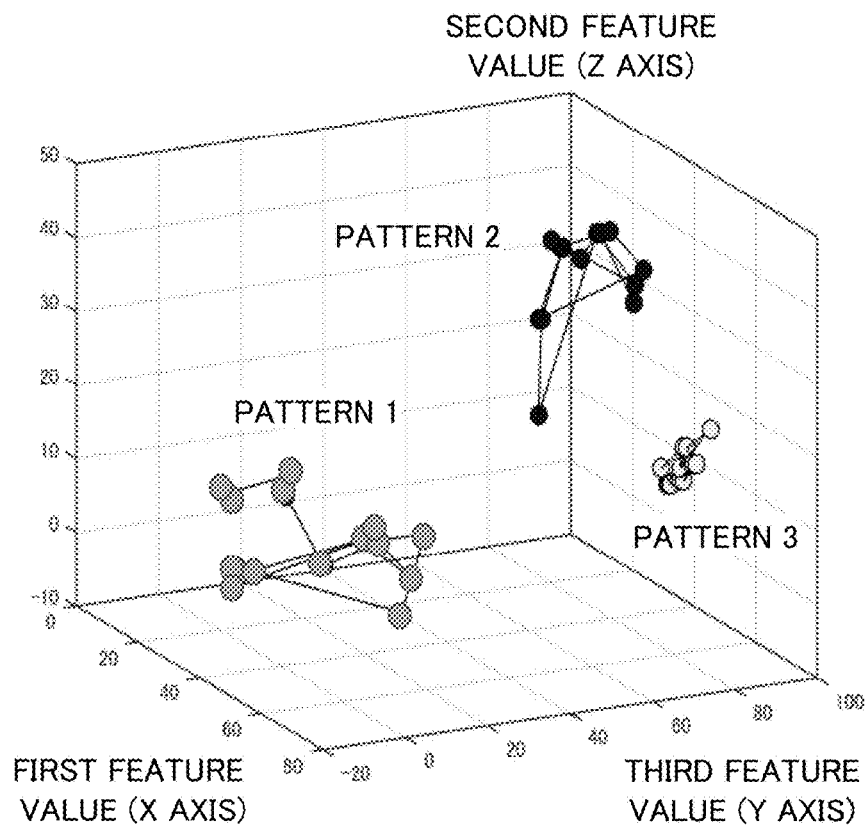
FIG. 13A and FIG. 13B are diagrams showing distinguishing results.
Figure 13B:
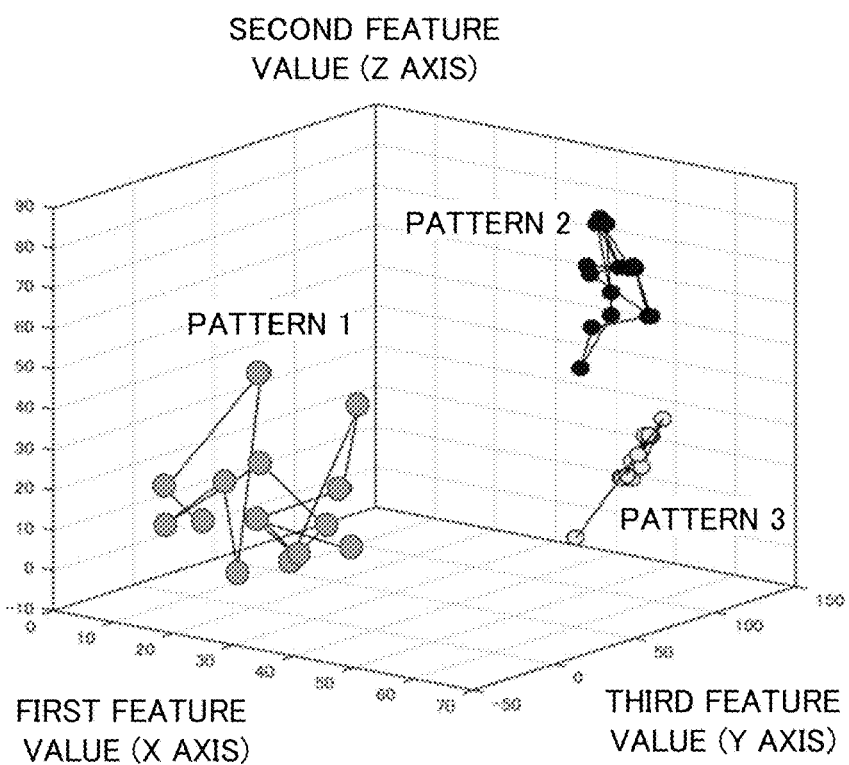

The distinguishing results will now be evaluated with reference to FIG. 13A and FIG. 13B.

FIG. 13A and FIG. 13B are distinguishing results obtained by performing the test 1 and the test 2 in the referring system learning method. The distinguishing result for each data pattern is shown by the degree of dispersion of the aggregation of points connected by lines. The X axis, the Y axis, and the Z axis in FIG. 13A represent the first feature value, the third feature value, and the second feature value of the time-series signal of the corresponding example. The color of the points is different with each pattern; the pattern 1 is shown in gray, the pattern 2 is shown in black, and the pattern 3 is shown in white. In both tests, the signals are separated in the same way in the referring system learning.

Figure 14A:
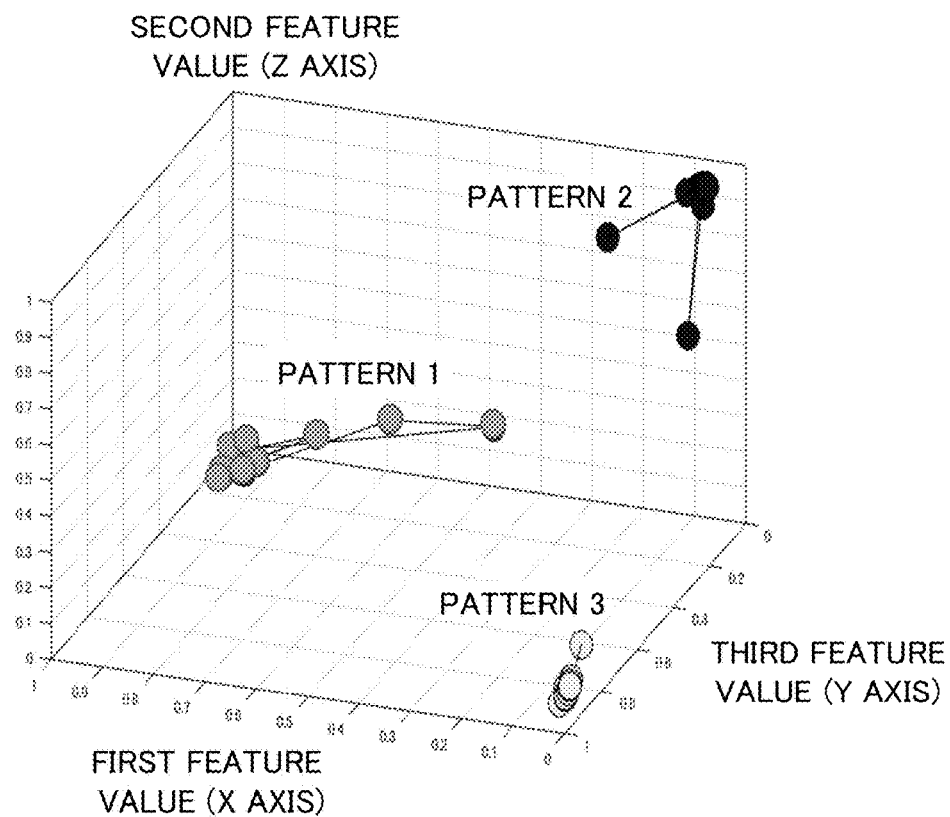
FIG. 14A and FIG. 14B are diagrams showing distinguishing results.
Figure 14B:
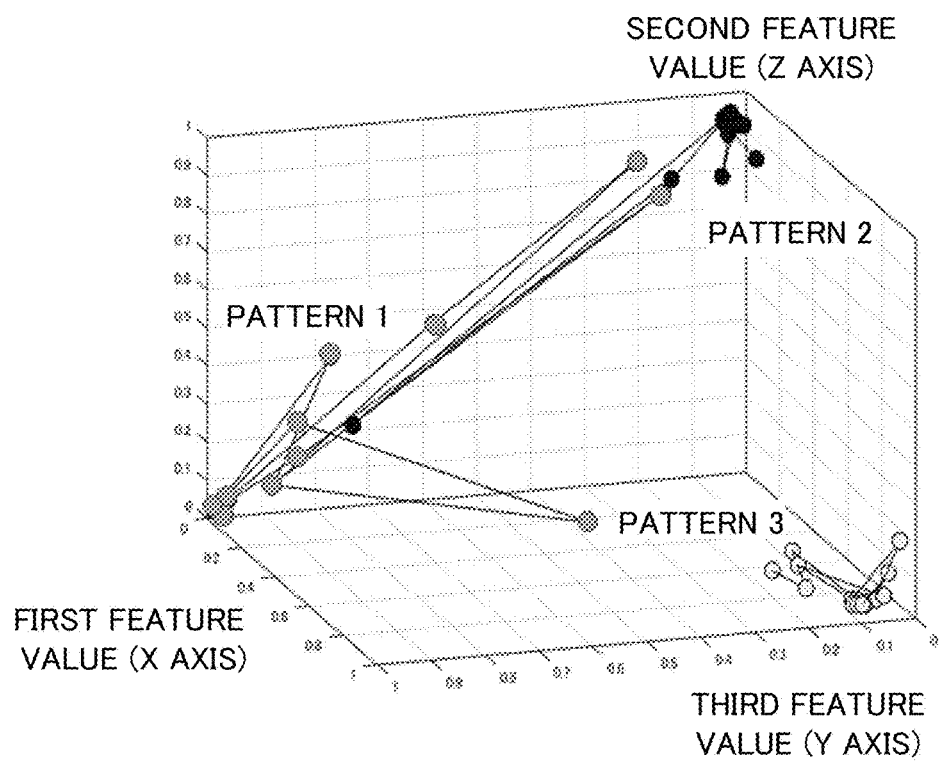

On the other hand, FIG. 14A and FIG. 14B are distinguishing results obtained by performing the test 1 and the test 2 in the deep learning method. As shown in FIG. 14A and FIG. 14B, it can be seen that the test 1 results in abnormally little dispersion and the test 2 results in excessively large dispersion, from which not distinguishing between the pattern 1 and the pattern 2 can be observed. This indicates over-learning of the data. Since it is not known what kind of noise is superimposed on the data (measuring system signal) of the distinguishing target as compared with the learning data in actual signal processing, it is difficult to know whether or not the distinguishing by feature values can be achieved from the result in the deep learning method, in which the contents are not visible. As the above, even if the distinguishing is mistakenly carried out, the deep learning method is unable to find the reason and requires relearning for the improvement. It was found that the present scheme can recognize mistake in the learning and therefore improve the performance of distinguishing.

<Learning Time>

Next, as shown in Table 1 below, it was found that the learning time of the present scheme is shorter than that of the comparison scheme. The present scheme is able to learn in about one seventh time of the comparison scheme. It can be considered that the present scheme requires about one-seventh the number of arithmetic operations in learning as compared with the comparison scheme.

TABLE 1

|  | Test 1 | Test 2 |
| --- | --- | --- |
| Referring system learning method | 0.16015 second | 0.17763 second |
| Deep learning method | 1.1993 second | 1.18873 second |

[3. Discussion]

As described above, in the present scheme, the distinguishing results of the tests 1 and 2 are not different so much, and the both tests have short learning times. From the above, it is understood that the present scheme can rapidly output stable distinguishing results in spite of noise in the data of distinguishing target.

In contrast, the comparison scheme showed variations in the distinguishing results, in particular, in the test 2. This cause is inferred to be over-learning in the deep learning method. It seems that, as a result of over-learning the data containing a little noise, mistakenly determination was made on data containing much noise, so that the significant of data of distinguishing target was not correctly asserted.

[III. Miscellaneous]

The above embodiment is merely illustrative and there is no intention to exclude the application of various modifications and techniques not explicitly described in this embodiment. Each configuration of the present embodiment can be variously modified and implemented without departing from the scope thereof. Also, the configuration can be selected or omitted according to the requirement or appropriately combined.

One of the conceivable examples of the application of the present disclosure is a medical field. For example, the present signal processing scheme can be used to diagnose physical condition and illness from human voices. A defective physical condition is closely related to disturbance of the autonomic nervous system. Since the glottis of the human throat is regulated by the recurrent laryngeal nerve of the autonomous nervous system, the good or bad of the physical condition appears in the voice under the influence of the autonomous nervous system. Therefore, analyzing voices makes it possible to judge the turbulence of autonomous nervous system and the good or bad of the physical condition. Furthermore, it is also possible to find illnesses that cause a defective physical condition. In this case, it is conceivable to apply this signal processing scheme using a voice signal as a measuring system signal, and a voice of the person with the type of physical condition defect and the discovered illness as a referring system signal.

Thereby, management of a physical condition and remote medical treatment can be carried out more conveniently.

In addition, one of the features of this signal processing scheme is that a time-series signal can be analyzed. A feature extracted from the time-series data by the present scheme is easily combined with other biochemical data, for example.

In addition, the present scheme can be applied to a communication field to carry out the conventional noise cancellation.

Alternatively, the present signal processing scheme can be used for so-called big data and IoT (Internet of Things).

All examples and conditional language provided herein are intended for pedagogical purposes to aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although one or more embodiment(s) of the present disclosure have been described in detail, it should be understood that the various changes, substitutions, and alterations could be made hereto without departing from the spirit and scope of the disclosure.

What is claimed is:

1. A signal processing method performed by a processor circuitry, the method comprising:
    obtaining signals of two systems, the signals being a measuring system signal and a referring system signal, the measuring system signal being a measurable series signal expressed in a real space, and the referring system signal being referred in a process of the measuring system signal and being expressed in the real space;
    extracting, based on a process using the signals of the two systems obtained in the obtaining and being performed in the real space, the process being a forward processing using a function arithmetic operation, a time-series feature expressing a feature of the measuring system signal in the real space; and
    converting the time-series feature extracted in the extracting into a real-expression-feature, the real-expression-feature being an expression of an information space corresponding to the real space.

2. The signal processing method according to claim 1, further comprising:
    distinguishing, based on the real-expression-feature converted in the converting and the times-series feature extracted in the extracting, a plurality of the measuring system signals.

3. The signal processing method according to claim 2, wherein the distinguishing comprises learning that distinguishes, based on at least one of a first combination of the real-expression-features converted thereto in the converting and a second combination of the time-series features extracted in the extracting, the plurality of measuring system signals.

4. The signal processing method according to claim 3, wherein the distinguishing comprises updating that enhances, based on the first combination and the second combination, a precision of the referring system signal.

5. The signal processing method according to claim 1, wherein the obtaining comprises a pre-processing and the measuring system signal is obtained by converting a signal source of the information space in the pre-processing.

6. The signal processing method according to claim 1, wherein the obtaining comprises pre-obtaining that obtains teacher data as the referring system signal.

7. The signal processing method according to claim 1, the real-expression-feature is a visualized expression of a reason for result of distinguishing.

8. The signal processing method according to claim 2, a result of the distinguishing is output at a display.

9. A signal processing device comprising:
a memory; and
processor circuitry coupled to the memory; wherein
the processor circuitry comprises obtaining processor circuitry, extracting processor circuitry, and a converter,
the obtaining processor circuitry configured to obtain signals of two systems, the signals and a referring system signal, the measuring system signal being a measureable series signal expressed in a real space, and the referring system signal being referred in a process of the measuring system signal and being expressed in the real space;
the extracting processor circuitry configured to extract, based on a process using the signals of the two systems obtained by the obtaining processor circuitry and being performed in the real space, the process being a forward processing using a function arithmetic operation, a time-series feature expressing a feature of the measuring system signal in the real space; and
the converter configured to convert the time-series feature extracted by the extractor into a real-expression-feature, the real-feature being an expression of an information space corresponding to the real space.

10. The signal processing device according to claim 9, wherein:
the processor circuitry further comprises distinguishing processor circuitry,
the distinguishing processor circuitry is configured to distinguish, based on the real-expression-feature converted by the converter and the time-series feature extracted by the extracting processor circuitry, a plurality of the measuring system signals.

11. The signal processing device according to claim 10, wherein the distinguishing processor circuitry comprises training processor or circuitry configured to distinguish, based on at least one of a first combination of the real-expression-features converted by the converter and a second combination of the time-series features extracted by the extracting processor circuit, the plurality of measuring system signals.

12. The signal processing device according to claim 11, wherein the distinguishing processor circuitry comprises updating processor circuitry configured to enhance, based on the first combination and the second combination, a precision of the referring system signal.

13. The signal processing device according to claim 9, wherein the obtaining processor circuitry comprises a preprocessor and the measuring system signal is obtained by converting a signal source of the information space at the processor.

14. The signal processing device according to claim 9, wherein the obtaining processor circuitry comprises pre-obtaining processor circuitry configured to obtain teacher data as the referring system signal.

15. A non-transitory computer-readable recording medium having stored therein a signal processing program that, when executed by a computer causes a processor circuitry of the computer to execute:
obtaining signals of two systems, the signals and a referring system signal, the measuring system signal being a measurable series signal expressed in a real space, and the referring system signal being referred in a process of the measuring system signal and being expressed in the real space;
extracting, based on a process using the signals of the two systems obtained and being performed in the real space, the process being a forward processing using a function arithmetic operation, a time-series feature expressing a feature of the measuring system signal in the real space; and
converting the time-series-feature extracted into a real-expression-feature, the real-expression-feature being an expression of an information space corresponding to the real space.

* * * * *